(12) United States Patent
Biswas et al.

(10) Patent No.: US 10,608,891 B2
(45) Date of Patent: Mar. 31, 2020

(54) WIRELESS ACCESS POINT THROUGHPUT

(71) Applicant: Cisco Technology, Inc., San Jose, CA (US)

(72) Inventors: Sujit Biswas, San Jose, CA (US); Aleksandar Miodrag Ivanovic, Santa Clara, CA (US); Waseem A. Siddiqi, Campbell, CA (US); Rajesh S. Pazhyannur, Fremont, CA (US); Manjula Shivanna, San Jose, CA (US); Kedar Krishnanand Gaonkar, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 194 days.

(21) Appl. No.: 15/853,481

(22) Filed: Dec. 22, 2017

(65) Prior Publication Data
US 2019/0199598 A1    Jun. 27, 2019

(51) Int. Cl.
| H04L 12/24 | (2006.01) |
| H04W 24/06 | (2009.01) |
| H04L 12/26 | (2006.01) |
| G06N 20/00 | (2019.01) |

(52) U.S. Cl.
CPC ........... *H04L 41/147* (2013.01); *G06N 20/00* (2019.01); *H04L 43/0888* (2013.01); *H04W 24/06* (2013.01); *H04L 43/062* (2013.01)

(58) Field of Classification Search
USPC ......................................................... 709/224
See application file for complete search history.

(56) References Cited

U.S. PATENT DOCUMENTS

| 9,894,580 | B1* | 2/2018 | Chen | H04W 36/18 |
| 2007/0086353 | A1* | 4/2007 | Gefflaut | H04L 1/002 |
| | | | | 370/252 |
| 2010/0061349 | A1* | 3/2010 | Gates | H01Q 1/007 |
| | | | | 370/338 |
| 2015/0117228 | A1* | 4/2015 | Daub | H04W 72/082 |
| | | | | 370/252 |

* cited by examiner

Primary Examiner — Hermon Asres
(74) Attorney, Agent, or Firm — Johnson, Marcou, Isaacs & Nix, LLC

(57) ABSTRACT

Predicting data throughput with a user device comprises a wireless system supported by wireless access points receiving signals from the user device. A wireless prediction system receives data from the wireless system, where the data comprises characteristics of the wireless access point, characteristics of communications with user computing devices, and data throughput statistics. The prediction system categorizes the received data based on one or more of a set of characteristics and determines a maximum data throughput capacity for each of the one or more wireless access points for each of the one or more set of characteristics. The system receives a request for a prediction of data throughput capacity for a particular wireless access point and, based on the characteristics of the particular wireless access point, determines an estimated data throughput capacity based on data throughputs of wireless access points having similar characteristics.

20 Claims, 5 Drawing Sheets

205

```
┌─────────────────────────────────────────────────────────────┐
│ Method for a capacity prediction system to collect data from │
│                wireless system access points                 │
└─────────────────────────────────────────────────────────────┘
                              │
                              ▼                            305
┌─────────────────────────────────────────────────────────────┐
│ One or more access points performs data communications with │
│     one or more user computing devices via wireless         │
│                      communications                         │
└─────────────────────────────────────────────────────────────┘
                              │
                              ▼                            310
┌─────────────────────────────────────────────────────────────┐
│  Capacity prediction system logs static conditions          │
│           associated with one of the access points          │
└─────────────────────────────────────────────────────────────┘
                              │
                              ▼                            315
┌─────────────────────────────────────────────────────────────┐
│  Capacity prediction system logs conditions associated with │
│         one of the access points while data is communicated │
└─────────────────────────────────────────────────────────────┘
                              │
                              ▼                            320
┌─────────────────────────────────────────────────────────────┐
│  Capacity prediction system logs the actual amount of data  │
│                       communicated                          │
└─────────────────────────────────────────────────────────────┘
                              │
                              ▼
                          ┌───────┐
                          │ Fig. 2│
                          │  210  │
                          └───────┘
```

```
┌─────────────────────────────────────────────────────────────┐
│  Method for a capacity prediction system to compare data    │
│         rates with features of the access points            │
└─────────────────────────────────────────────────────────────┘
                              │
                              ▼                            405
┌─────────────────────────────────────────────────────────────┐
│ Capacity prediction system sorts the various conditions     │
│ under which the data has been obtained and categorizes      │
│ the throughput data                                         │
└─────────────────────────────────────────────────────────────┘
                              │
                              ▼                            410
┌─────────────────────────────────────────────────────────────┐
│ Capacity prediction system charts the data communication    │
│ rates under various categories of conditions                │
└─────────────────────────────────────────────────────────────┘
                              │
                              ▼                            415
┌─────────────────────────────────────────────────────────────┐
│ Capacity prediction system identifies the top percentage of │
│ data communication rates under various categories of        │
│ conditions                                                  │
└─────────────────────────────────────────────────────────────┘
                              │
                              ▼
                         Fig. 2
                          215
```

WIRELESS ACCESS POINT THROUGHPUT

TECHNICAL FIELD

This disclosure relates to predicting the maximum amount of data that a wireless access point can communicate based on characteristics of the wireless access point, the environmental conditions, and characteristics of user computing devices.

BACKGROUND

Wireless computing systems that provide Internet services and other wireless signal services to user computing devices, such as mobile smartphones, are deployed in many public and private locations. For example, a mall or a hotel may deploy a wireless access point to provide a wireless network connection to a user computing device. A facility may provide multiple wireless access points to cover a larger area. For example, a sports arena may provide many wireless access points to allow wireless network access for users throughout the facility.

A conventional wireless computing system may select the number of wireless access points required to service the expected number of user computer devices. However, a conventional wireless computing system is unable to accurately predict the throughput capacity of each wireless access point in its operational environment. Such inaccuracies lead to improper design of conventional wireless computing systems, which have insufficient throughput for a desired operation. Further, such inaccuracies lead to inefficient distribution of the data load among a number of access points.

BRIEF DESCRIPTION OF THE DRAWINGS

FIG. 3 is a block flow diagram depicting a method for a capacity prediction system to collect data from wireless system access points, in accordance with certain examples.

FIG. 4 is a block flow diagram depicting a method for a capacity prediction system to compare data rates with characteristics of the access points, in accordance with certain examples.

DETAILED DESCRIPTION

Overview

Figure 1:
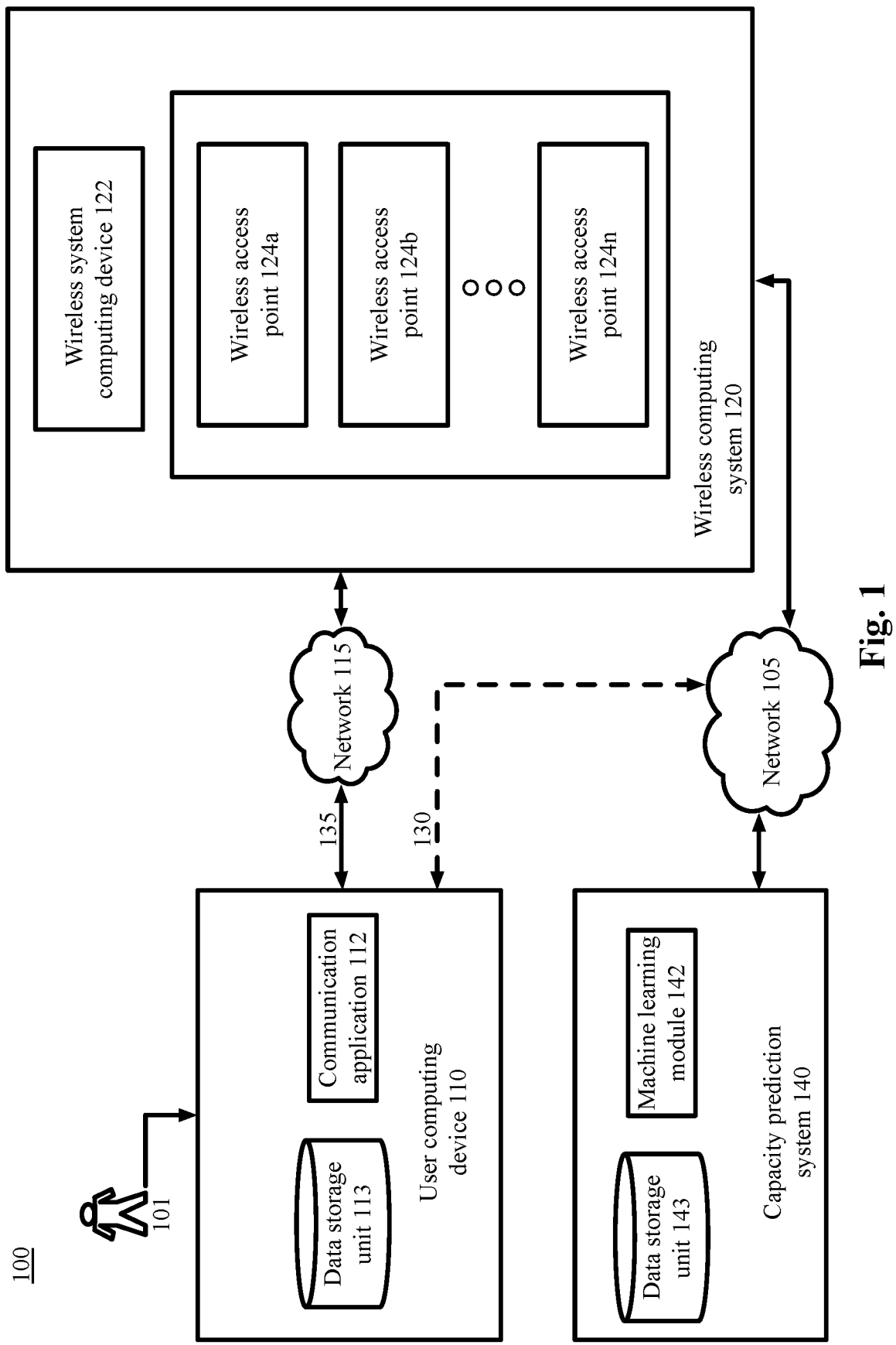
FIG. 1 is a block diagram depicting a system to predict the maximum amount of data that a wireless access point can communicate, in accordance with certain examples.

In an example embodiment, a wireless computing system includes a wireless access point ("AP") or multiple APs. Multiple APs may be deployed to improve the coverage area of the wireless computing system. For example, a system designer or installer desires to determine the number of APs needed to service the expected number of user computing devices communicating with the APs. The number of APs required is also affected by other factors, such as the position of the APs, the distance from the user computing devices of the APs, interferences with the signals, the data rates of the communications, the types of APs used, and other similar factors.

In the example, a capacity prediction system logs the throughput for multiple APs in multiple locations. The capacity prediction system logs the characteristics of the APs, such as the type of AP used, the location, the amount of interference, and other characteristics of the AP.

The capacity prediction system determines the maximum capacity of the AP for a given set of characteristics based on an analysis of the logged throughput data. In an example, the maximum capacity is the top 1% of the logged throughput in the throughput data. The system assumes that the top throughput is indicative of the maximum capacity. For a given AP, the capacity prediction system can predict the maximum capacity based on a comparison of the characteristics of the given AP to the maximum capacity of similarly situated APs in the logged data.

In an example, if a particular brand and model of AP has a likely ten users, operating a particular type of user computer device, with a particular amount of noise and interference from the environment, that is an average of 40 feet away from the user computing devices, then the capacity prediction system can use the analyzed logged data to predict the maximum capacity of data throughput of the particular AP. The analysis can be based on identifying the logged data of an AP that has the same, or similar, characteristics. In another example, the analysis can determine the effect of each characteristic on the maximum capacity and provide an overall prediction by combining the effects. In another example, a model of a similarly situated AP is created based on the multiple characteristics of the particular AP. In another example, the capacity prediction system uses a machine learning process to analyze the data. By entering the AP data into the machine learning algorithm, the capacity prediction system is able to provide increasingly more accurate predictions of the throughput capacity of the APs. That is, with each input of the data regarding the characteristics of an AP and the associated throughput of that AP, the machine learning process is able to refine predictions of future APs. The capacity prediction system may utilize machine learning techniques such as generalized linear model ("GLM") or gradient boosting ("GBT").

By using and relying on the methods and systems described herein, a wireless computing system is able to install more reliable and capable wireless systems. The wireless computing system is able to use the data generated by the capacity prediction system to select and position a number of APs that will be able to support the data requirements of the users. The information provided by the capacity prediction system will also allow a wireless computing system to change the power to various APs to better distribute the data load among a number of APs or make other suitable changes to the communication methods to improve data flow patterns. By understanding the capabilities of the APs, changing the characteristics of the APs and the environment around the APs, and making other changes based on the data provided by the capacity prediction system, the wireless computing system is able to optimize the data throughput without causing delays or backlogs for users that are communicating with the APs.

These and other aspects, objects, features, and advantages of the example embodiments will become apparent to those having ordinary skill in the art upon consideration of the following detailed description of illustrated example embodiments. Turning now to the drawings, in which like numerals represent like (but not necessarily identical) elements throughout the figures, example embodiments are described in detail.

Example System Architectures

Turning now to the drawings, in which like numerals represent like (but not necessarily identical) elements throughout the figures, example embodiments are described in detail.

FIG. 1 is a block diagram depicting a system 100 to predict the maximum amount of data that a wireless access point ("AP") can communicate, in accordance with certain examples.

As depicted in FIG. 1, the system 100 includes a user computing device 110, a wireless computing system 120, and a capacity prediction system 140 that are configured to communicate with one another via one or more networks 105, 115 or via any suitable communication technology. The wireless computing system 120 employs one or more wireless access points ("APs") 124a-n. Three APs 124a, 124b, and 124n are depicted in FIG. 1. However, the wireless computing system 120 may include any suitable number of APs 124 as configured for a particular wireless computing system 120. The APs 124a-n may sometimes be identified throughout this specification individually as APs 124a-n or collectively as AP 124n.

Each network, such as networks 105 and 115, includes a wired or wireless telecommunication mechanism and/or protocol by which the components depicted in FIG. 1 can exchange data. For example, each networks 105, 115 can include a local area network ("LAN"), a wide area network ("WAN"), an intranet, an Internet, a mobile telephone network, storage area network (SAN), personal area network (PAN), a metropolitan area network (MAN), a wireless local area network (WLAN), a virtual private network (VPN), a cellular or other mobile communication network, Bluetooth, NFC, Wi-Fi, or any combination thereof or any other appropriate architecture or system that facilitates the communication of signals or data. Throughout the discussion of example embodiments, it should be understood that the terms "data" and "information" are used interchangeably herein to refer to text, images, audio, video, or any other form of information that can exist in a computer-based environment. The communication technology utilized by the components depicted in FIG. 1 may be similar to network technology used by networks 105, 115 or an alternative communication technology.

Each component depicted in FIG. 1 includes a computing device having a communication application capable of transmitting and receiving data over the networks 105, 115 or a similar network. For example, each can include a server, desktop computer, laptop computer, tablet computer, a television with one or more processors embedded therein and/or coupled thereto, smart phone, handheld or wearable computer, personal digital assistant ("PDA"), other wearable device such as a smart watch or glasses, wireless system access point, or any other processor-driven device.

In the example embodiment depicted in FIG. 1, the user computing device 110 is operated by an end-user or consumer 101, the wireless computing system 120 is operated by a wireless system operator (not depicted), and the capacity prediction system 140 is operated by a capacity prediction system operator (not depicted).

As shown in FIG. 1, the user computing device 110 includes a data storage unit 113 accessible by a communication application 112. The example data storage unit 113 can include one or more tangible computer-readable storage devices. The data storage unit 113 can be disposed on the user computing device 110 or can be logically coupled to the user computing device 110. For example, the data storage unit 113 can include on-board flash memory and/or one or more removable memory devices or removable flash memory. In example embodiments, the data storage unit 113 may reside in a cloud based computing system. The data storage unit 113 may store instructions executable by the user computing device 110 to perform the functions described herein.

In an example embodiment, the communication application 112 of the user computing device 110 communicates with the APs 124n over the network 115 via communication path 135 using Wi-Fi or other wireless communication technology, such as Bluetooth, infrared, or other suitable technology. The user computing device 110 may access the Internet or other systems via the APs 124n. In an example embodiment, when the user computing device 110 communicates with the wireless computing system 120 via the network 115, the user computing device 110 may access the network 105 via the wireless computing system 120. That is, the user computing device 110 may utilize the wireless computing system's 120 connection to the network 105 to access the Internet or any other system or device.

In an alternate example embodiment, the communication application 112 communicates with the Internet, the wireless computing system 120, or other suitable systems or devices, via a connection to the network 105 along communication path 130. The communication path 130 may be a cellular communication technology or any other suitable technology, such as Wi-Fi. The user computing device 110 may utilize communication path 130 to network 105 to communicate when the communication path 135 via network 115 is not available. For example, if the user computing device 110 is out of range of a signal from APs 124n, then the user computing device 110 may instead use a cellular connection to network 105 via communication path 130. In an example, the user computing device 110 may use communication path 135 via network 115 as a path to access the Internet because this connection, such as a Wi-Fi connection, may consume less of the bandwidth, battery power, or data allowance of the user computing device 110 compared to the communication path 130.

The communication application 112 on the user computing device 110 may be, for example, a web browser application or a stand-alone application, to view, download, upload, or otherwise access documents or web pages via the networks 105, 115. The communication application 112 can interact with web servers or other computing devices connected to the network 105.

In some embodiments, the user 101 associated with a user computing device 110 can install an application and/or make a feature selection to obtain the benefits of the techniques described herein.

As shown in FIG. 1, the wireless computing system 120 includes a wireless system computing device 122 and the APs 124a-n. The wireless system computing device 122 may be a server or other device that is used to perform the computing functions of the wireless computing system 120 and to coordinate communication to/from the APs 124a-n. In an example, the wireless system computing device 122 is used to configure the wireless technologies utilized by the APs 124n. The wireless system computing device 122 stores received data, performs calculations related to the location of the user computing device 110, or performs any other suitable actions. Any other computing or storage function required by the wireless computing system 120 may be performed by the wireless system computing device 122.

Any function performed in the methods described herein by the APs 124n may be performed by any one or more of the APs 124a, 124b . . . 124n, unless otherwise specified. Any function performed in the methods described herein by the APs 124n may be performed by the wireless system computing device 122 or other computing system associated with the APs 124n. Any function performed in the methods described herein by the wireless system computing device 122 may be performed by one or more of the APs 124n or other computing system associated with the APs 124n or the wireless computing system 120.

Each AP 124n comprises hardware and software to communicate with the user computing device 110 or the network 105 via any suitable communication technology. For example, each AP 124n may utilize an antenna or other hardware to improve transmission/reception of wireless signals. Each AP 124n may communicate with the networks 105, 115 or the user computing device 110 via Wi-Fi or other wireless communication technology, such as Bluetooth, infrared, cellular, or other suitable technology. The APs 124n may be in communication with a wireless system computing device 122 that manages the operations of the APs 124n. The APs 124n may be wired or otherwise logically coupled to the wireless system computing device 122 to allow access to the network 105 or for any other suitable purpose. The calculation functions or other processing functions of the APs 124n may be performed by a processor or other computing system onboard the AP 124n or of the wireless computing system 120. Additionally, the functions of the wireless computing system 120 may be performed by the APs 124n or the wireless system computing device 122.

The capacity prediction system 140 represents any system or computing device that is used to analyze AP 124n data to determine relationships between AP characteristics and throughput capacities. In an example, the capacity prediction system 140 utilizes a machine learning module 142 to analyze the data. By entering the AP data into the machine learning module 142, the capacity prediction system 140 is able to provide increasingly more accurate predictions of the throughput capacity of the APs 124n. That is, with each input of the data regarding the characteristics of an AP 124n and the associated throughput of that AP 124n, the machine learning process is able to refine predictions of future APs. The machine learning module 142 may utilize machine learning techniques such as generalized linear model ("GLM"), gradient boosting ("GBT"), or any other suitable machine learning technique.

The capacity prediction system 140 includes a data storage unit 143 accessible by a communication application 112. The example data storage unit 143 can include one or more tangible computer-readable storage devices. The data storage unit 143 can be disposed on the capacity prediction system 140 or can be logically coupled to the capacity prediction system 140. For example, the data storage unit 143 can include on-board flash memory and/or one or more removable memory devices or removable flash memory. In example embodiments, the data storage unit 143 may reside in a cloud based computing system. The data storage unit 143 may store instructions executable by the capacity prediction system 140 to perform the functions described herein.

Figure 5:
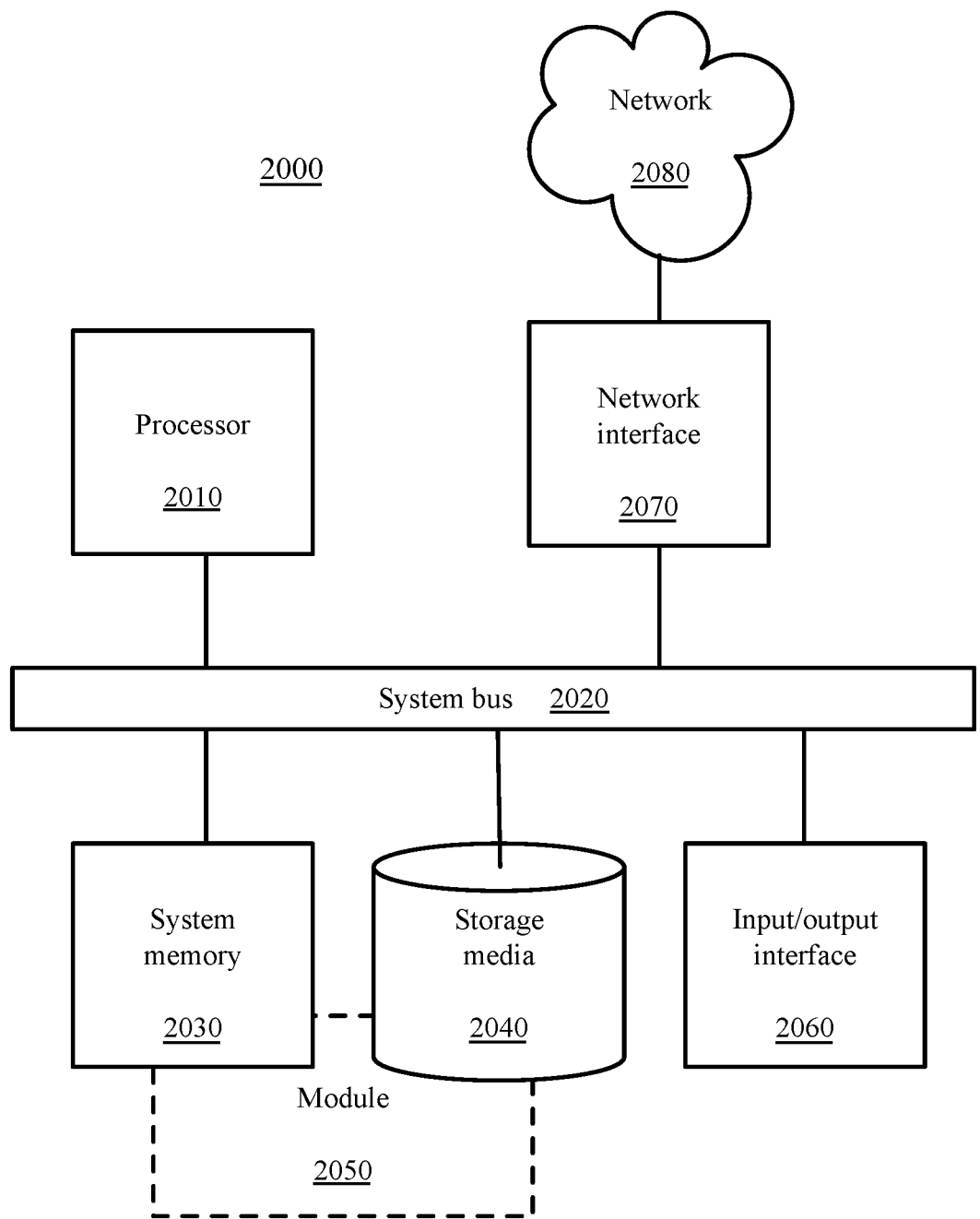
FIG. 5 is a block diagram depicting a computing machine and a module, in accordance with certain examples.

In example embodiments, the network computing devices and any other computing machines associated with the technology presented herein may be any type of computing machine such as, but not limited to, those discussed in more detail with respect to FIG. 5. Furthermore, any functions, applications, or components associated with any of these computing machines, such as those described herein or any other others (for example, scripts, web content, software, firmware, hardware, or modules) associated with the technology presented herein may by any of the components discussed in more detail with respect to FIG. 5. The computing machines discussed herein may communicate with one another, as well as with other computing machines or communication systems over one or more networks, such as networks 105, 115. The networks 105, 115 may include any type of data or communications network, including any of the network technology discussed with respect to FIG. 5.

Example Embodiments

Figure 2:
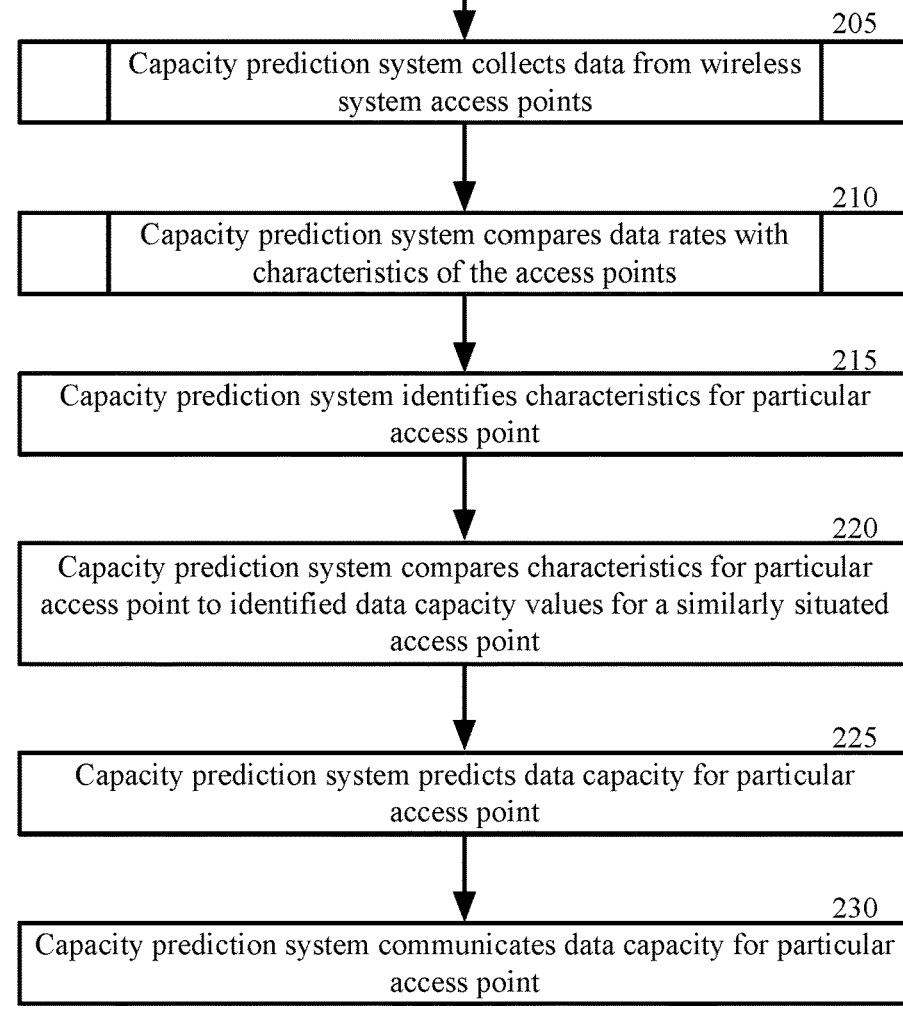
FIG. 2 is a block flow diagram depicting a method to predict the maximum amount of data that a wireless access point can communicate, in accordance with certain examples.

The example methods illustrated in FIGS. 2-4 are described hereinafter with respect to the components of the example operating environment 100. The example methods of FIGS. 2-4 may also be performed with other systems and in other environments.

FIG. 2 is a block flow diagram depicting a method to predict the maximum amount of data that a wireless access point ("AP") can communicate, in accordance with certain examples.

With reference to FIGS. 1 and 2, in block 205, a capacity prediction system 140 collects data from wireless system APs 124n. Block 205 is shown in greater detail with respect to method 205 in FIG. 3.

FIG. 3 is a block flow diagram depicting a method for a capacity prediction system to collect data from wireless system APs 124n, in accordance with certain examples. In block 305, one or more APs 124n perform data communications with one or more user computing devices 110 via wireless communications via one or more APs 124n.

For example, users 101 with user computing devices 110 enters one or more facilities including one or more wireless computing systems 120, which comprises wireless access points 124a, 124b . . . 124n and wireless computing system devices 122. Each wireless AP 124n in a particular facility may be distributed throughout a particular area of the facility or throughout the entire facility. For example, two or more APs 124n may be distributed in different sections of a mall or office building.

Each AP 124n may be situated to transmit and receive Wi-Fi or other signals in a particular area of the facility. In another example, the APs are distributed throughout indoor or outdoor areas of a hotel, an airport, an office complex, a sports area, a park, a campground, a shopping center, or any other suitable location that desires to provide a Wi-Fi signal to the general public, employees, invited guests, or any other suitable users. The Wi-Fi signal provided by the APs 124n may be free, require a fee, require a password, or any other suitable requirements. The Wi-Fi signal may instead use any other wireless communication technology, such as Bluetooth, infrared, cellular, or any other suitable technology.

The users 101 may enter the locations serviced by the APs 124n. The user 101 may have a user computing device 110, such as a mobile smartphone, that is in use or stored in a pocket, a bag, or other suitable location. In an example, the user 101 must activate a Wi-Fi service on the user computing device 110 to practice steps of the described methods.

One or more of the APs 124n initiates a communication with the user computing device 110. Each AP 124n may transmit a beacon signal or other communication that the user computing device 110 recognizes as an invitation to initiate a communication session. In another example, the user computing device 110 may transmit a communication that the AP 124n recognizes as an invitation to initiate a communication session. The user computing device 110 and each AP 124n may transmit identification information to each other to establish the communication session.

In block 310, the capacity prediction system 140 also logs static characteristics of each AP 124n that are available to the capacity prediction system 140. For example, the brand and model of the AP 124n, the position of the 124n, the height of the AP 124n above the floor, consistent interferences with the signals, the amount of power available to the AP 124n, the type of antennas being used by the AP 124n, and other similar factors. These factors each may affect the maximum capacity of an AP 124n. For example, a greater amount of environmental interference with the signal may reduce the amount of capacity of the AP 124n.

In block 315, the capacity prediction system 140 also logs conditions associated with one of the APs 124n while data is communicated. For example, the distance from the user computing devices 110 of the AP 124n, the data rates of the communications, the amount of power provided to the AP 124n, signal strength of each user computing device 110, and other similar factors. These factors each may affect the maximum capacity of an AP 124n. For example, a larger, more powerful antenna may increase the capacity of the AP 124n. In another example, a greater distance from the user computing devices 110 may reduce the amount of capacity of the AP 124n as compared to a shorter distance.

In block 320, the capacity prediction system 140 logs the actual amount of data being communicated and received by each AP 124n. The amount of data typically varies with the amount of usage by users 101 in the area. At certain times, the usage may reach the maximum capacity of which the AP 124n is capable under the present conditions. That is, based on the current number of users 101, the noise in the area, the interference with the signal, or any other factors, the AP 124n is receiving and/or communicating the maximum amount of data of which the AP 124n is capable. At other times, the AP 124n may not be operating at maximum capacity and may be able to perform additional communications if needed.

From block 320, the method 205 returns to block 210 of FIG. 2. In block 210 of FIG. 2, the capacity prediction system 140 compares data rates with characteristics of the APs 124n. Block 210 is shown in greater detail with respect to method 210 in FIG. 4.

FIG. 4 is a block flow diagram depicting a method 210 for a capacity prediction system 140 to compare data rates with characteristics of the APs 124n, in accordance with certain examples.

In block 405, the capacity prediction system 140 sorts the various conditions under which the data has been obtained and categorizes the throughput data. For example, the capacity prediction system 140 recognizes that a particular AP 124a that is being logged is a Model X from Manufacturer Y. The data from the particular AP 124a is associated with the category Model X from Manufacturer Y. In another example, the particular AP 124a that is being logged is receiving a particular degree of interference from two neighboring APs. The data from the particular AP 124a is associated with a category specifying this degree of interference.

In block 410, the capacity prediction system 140 charts the data communication rates under various categories of conditions. The capacity prediction system 140 analyses the throughput data for each AP 124n in each category. In an example, the capacity prediction system 140 creates a graph of the data throughput based on a single category or multiple categories.

In an example, a graph may be created of the data throughput of an AP 124a with the following characteristics: Model X from Manufacturer Y, located three feet from a vertical wall and twenty feet from the floor of the facility, primarily communicating with an average of ten Brand Z user computing devices using a particular data communication rate, and low background noise. The graph may log the data throughput compared to the amount of interference being received from neighboring APs 124n. Any other suitable combination of characteristics may be graphed. Any number of categories may be used in the graph. For example, a graph may be created based on only a single characteristic based on the model of the antenna or any other number of characteristics.

Instead of a single AP 124a with these characteristics, a model AP 124n may be created using a blended or averaged data throughput of multiple APs 124n. For example, a model may be created that blends data for one group of APs 124n that are use the same antenna with a second group of APs 124n that have a similar amount of background noise. The model may use the logged data of these two categories of APs 124n to create a model that is predictive of a particular AP 124n with these characteristics.

In block 415, the capacity prediction system 140 identifies the top percentage of data communication rates under various categories of conditions. In an example, the capacity prediction system 140 determines that the top 1% of the data throughput rate is the maximum capacity of the AP 124n. That is, the capacity prediction system 140 assumes that at some point during the time that the data was logged, the AP 124n is operating at or near capacity. If so, the highest data throughput would represent the data capacity of the AP 124n under those particular conditions. The top 1% of the data logged may be graphed over a change in one of the characteristics to achieve a predictive model of the AP 124n under changing conditions. For example, a graph may be created displaying the predicted data capacity for a particular AP 124a for each successive percentage of interference received from neighboring APs 124n.

From block 415, the method 210 returns to block 215 of FIG. 2.

Returning to FIG. 2, in block 215, the capacity prediction system 140 identifies characteristics for a particular AP 124a. The capacity prediction system 140 obtains the characteristics in any suitable manner. For example, the capacity prediction system 140 may query the AP 124a to obtain the model of the AP 124a and the associated antenna. The capacity prediction system 140 may query the wireless computing system 120 to obtain a historical number of average daily users 101. The capacity prediction system 140 may receive input from an operator regarding the positioning of the AP 124a, such as the distance from a wall, height above a facility floor, or any other suitable characteristic. The capacity prediction system 140 may obtain a sample of the data recently communicated by the AP 124a to determine the data rates of communications with user computing devices 110, the typical signal strength of the communications with user computing devices 110. Any other suitable method of obtaining characteristics of the AP 124a may be utilized.

In block 220, the capacity prediction system 140 compares characteristics for the particular AP 124a to identified data capacity values for a similarly situated AP 124n. After determining a set of characteristics of the AP 124a, the capacity prediction system 140 identifies data rates of similarly situated APs 124n. For example, the capacity prediction system 140 finds an AP 124n with the same characteristics as the AP 124*a*. The capacity prediction system 140 may provide a configured margin of error for certain characteristics to determine that the two APs 124*a*, 124*n* are substantially the same. For example, if AP 124*a* is eighteen feet over the floor, but 124*n* is twenty feet over the floor, the capacity prediction system 140 may determine that the two APs 124*a*, 124*n* have substantially the same characteristics.

In another example, the capacity prediction system 140 uses machine learning to build a model of an AP 124*n* that is substantially the same as AP 124*a*. The machine learning module 142 may receive the inputs of collected data as described herein and produce a model of expected data capacities of AP 124*a*. For example, each characteristic of AP 124*a* is communicated to the machine learning module 142. The machine learning module 142 considers the effect of each characteristic on the data rate of AP 124*a* to construct a model of how the data capacity is affected by each characteristic.

In block 225, the capacity prediction system 140 predicts the data capacity for the particular AP 124*a*. For example, based on the interplay of the characteristics in the model, the machine learning module 142 provides a prediction of the data capacity of the AP 124*a* under various conditions. As more data is provided to the machine learning module 142, the more accurate the predictions are likely to become.

If a direct comparison to a similarly situated AP 124*n* is used, then the capacity prediction system 140 is able to determine the data capacity based on the data capacity of the similarly situated AP 124*n*. That is, AP 124*a* will likely have a similar data capacity as the AP 124*n* under similar conditions.

In block 230, the capacity prediction system 140 communicates data capacity for the particular AP 124*a*. The data capacity may be provided to any suitable user. For example, the wireless computing system 120 receives the data capacity and uses the data capacity to determine the amount of power to provide to the AP 124*a*. In another example, the wireless computing system 120 uses the data capacity to determine if an additional AP 124*n* should be installed to provide additional system capacity. In another example, a system installer uses the data capacity to determine how many APs 124*n* to place in a given location and how to position the APs 124*n*. In another example, a user computing device 110 selects a different communication method to perform a particular task based on the predicted data capacity of the AP 124*n*. In another example, the wireless computing system 120 places data limits on a user computing device 110 that is utilizing a slow or low capacity communication technology. In another example, the wireless computing system 120 controls power to the APs 124*n* to restrict or expand the capacity of the APs 124*n* based on the data capacities of the APs 124*n*. Based on any of these examples, the wireless computing system 120 alters the configuration of the network, the APs 124*n*, the power supplies, or any other component based on the data capacities. The alteration allows data to be communicated more efficiently and allows a greater amount of data to be communicated.

Any other suitable usage of the data may be envisioned by any suitable computing device or system.

Other Example Embodiments

FIG. 5 depicts a computing machine 2000 and a module 2050 in accordance with example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a wearable computer, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, acts can be performed in a different order, in parallel with one another, omitted entirely, and/or combined between different example embodiments, and/or additional acts can be performed, without departing from the scope and spirit of various embodiments. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method, comprising:
   receiving, by one or more computing devices, data from one or more wireless access points, the data comprising, for each of the one or more wireless access points, characteristics comprising operational characteristics of the one or more wireless access points, communication characteristics for communications between the wireless access point and user computing devices, and previous data throughput statistics for the one or more wireless access points;
   determining, by the one or more computing devices, a maximum data throughput capacity for each of the one or more wireless access points under operating conditions reflecting each of the characteristics and combinations thereof;
   receiving, by the one or more computing devices, current operational characteristics and current communication characteristics for a particular wireless access point for which a data throughput prediction is desired;
   comparing, by the one or more computing devices, the current operational characteristics and the current communication characteristics of the particular wireless access point to the received data from the one or more wireless access points to identify a second particular wireless access point having similar operational characteristics and communication characteristics to the current operational characteristics and the current communication characteristics of the particular wireless access point;
   determining, by the one or more computing devices, a predicted data throughput capacity of the particular wireless access point based on the determined maximum data throughput capacity of the second particular wireless access point; and
   based on the predicted data throughput capacity of the particular wireless access point, adjusting, by the one or more computing devices, a power input to the particular wireless access point.

2. The computer-implemented method of claim 1, wherein the steps of determining, comparing, and determining are performed by a machine learning algorithm.

3. The computer-implemented method of claim 2, wherein the machine learning algorithm is one of a generalized linear model or gradient boosting.

4. The computer-implemented method of claim 1, wherein the operational characteristics comprises, for each of the wireless access points, one or more of a positioning of the wireless access point and a communication technology used by the wireless access point to communicate with the user computing devices.

5. The computer-implemented method of claim 1, wherein the communication characteristics comprises one or more of a number of user computing devices attempting simultaneous communication with the wireless access point, an amount of interference with communication signals received or communicated by the wireless access point, and an amount of environmental electronic noise affecting the wireless access point.

6. The computer-implemented method of claim 1, wherein the data throughput statistics for the wireless access point comprises a log of an amount of data the wireless access point is communicating over a configured period of time.

7. The computer-implemented method of claim 1, wherein the maximum data throughput capacity for each of the one or more wireless access points is based on capturing a highest amount of data throughput for each of the one or more wireless access points.

8. The computer-implemented method of claim 7, wherein the highest amount of data throughput for the one or more wireless access points is determined to be a top one percent of the data throughput when operating with a particular set of characteristics.

9. The computer-implemented method of claim 1, further comprising communicating, by the one or more computing devices, the predicted data throughput capacity of the particular wireless access point to a wireless computing device associated with the particular wireless access point.

10. The computer-implemented method of claim 1, further comprising determining, by the one or more computing devices, that additional wireless access points are required to achieve a desired throughput capacity for the one or more wireless access points.

11. The computer-implemented method of claim 1, further comprising determining, by the one or more computing devices, an alternate communication method for the particular wireless access to use to communicate when the estimated maximum data throughput capacity is determined to be less than a configured minimum.

12. The computer-implemented method of claim 1, wherein the particular wireless access point is separate from the one or more wireless access points from the first receiving step.

13. The computer-implemented method of claim 1, wherein the comparing step identifies only a second particular wireless access point having an exact match for one or more operational characteristics and communication characteristics to the current operational characteristics and the current communication characteristics of the particular wireless access point.

14. A computer program product, comprising:
   a non-transitory computer-readable storage device having computer-executable program instructions embodied thereon that when executed by a computer cause the computer to estimate data throughput capacities, the computer-executable program instructions comprising instructions to:
      receive data from one or more wireless access points, the data comprising, for each of the one or more wireless access points, characteristics comprising operational characteristics of the one or more wireless access points, communication characteristics for communications between the wireless access point and user computing devices, and previous data throughput statistics for the one or more wireless access points;

receive current operational characteristics and current communication characteristics for a particular wireless access point for which a data throughput prediction is desired;

create a model of a wireless access point having similar characteristics to the particular wireless access point;

estimate a data throughput capacity of the model wireless access point based on an analysis of data throughputs of one or more other wireless access points;

determine a predicted data throughput capacity of the particular wireless access point based on the estimated data throughput capacity of the model wireless access point; and based on the predicted data throughput capacity of the particular wireless access point, adjust a power input to the particular wireless access point.

15. The computer program product of claim 14, wherein the model of the wireless access point is based on a selection of the characteristics received from the one or more wireless access points.

16. The computer program product of claim 14, wherein the steps of creating, estimating, and determining are performed by a machine learning algorithm.

17. The computer program product of claim 14, wherein the machine learning algorithm is one of a generalized linear model or gradient boosting.

18. A system, comprising:
a storage device; and
a processor communicatively coupled to the storage device, wherein the processor executes application code instructions that are stored in the storage device to cause the system to:

receive data from one or more wireless access points, the data comprising, for each of the one or more wireless access points, characteristics comprising operational characteristics of the one or more wireless access points, communication characteristics for communications between the wireless access point and user computing devices, and previous data throughput statistics for the one or more wireless access points;

determine a maximum data throughput capacity for each of the one or more wireless access points under operating conditions reflecting each of the characteristics and combinations thereof;

compare current operational characteristics and current communication characteristics of a particular wireless access point to the received data from the one or more wireless access points to identify a second particular wireless access point having similar operational characteristics and communication characteristics to the current operational characteristics and the current communication characteristics of the particular wireless access point;

determine a predicted data throughput capacity of the particular wireless access point based on the determined maximum data throughput capacity of the second particular wireless access point;

based on the predicted data throughput capacity of the particular wireless access point, adjust a power input to the particular wireless access point.

19. The system of claim 18, wherein the data throughput statistics for the wireless access point comprises a log of an amount of data the wireless access point is communicating over a configured period of time.

20. The computer-implemented method of claim 1, wherein the power input is increased to expand the predicted data throughput capacity of the particular wireless access point.

* * * * *